US012460948B2

(12) United States Patent
Shihab et al.

(10) Patent No.: US 12,460,948 B2
(45) Date of Patent: Nov. 4, 2025

(54) RESOLVER QUADRANT DETECTION

(71) Applicant: Hamilton Sundstrand Corporation, Charlotte, NC (US)

(72) Inventors: Muhammed Shihab, Ernakulam (IN); Shardul Bapat, Bangalore (IN)

(73) Assignee: Hamilton Sundstrand Corporation, Charlotte, NC (US)

( * ) Notice: Subject to any disclaimer, the term of this patent is extended or adjusted under 35 U.S.C. 154(b) by 43 days.

(21) Appl. No.: 18/229,961

(22) Filed: Aug. 3, 2023

(65) Prior Publication Data

US 2024/0361155 A1   Oct. 31, 2024

(51) Int. Cl.
*G01D 5/20* (2006.01)

(52) U.S. Cl.
CPC .................. *G01D 5/2073* (2013.01)

(58) Field of Classification Search
CPC .................................................. G01D 5/2073
See application file for complete search history.

(56) References Cited

U.S. PATENT DOCUMENTS

| 3,504,361 | A | * | 3/1970 | Catton | H03M 1/485 |
| | | | | | 341/116 |
| 3,629,705 | A | * | 12/1971 | Walters | G01P 13/045 |
| | | | | | 340/870.34 |
| 3,997,893 | A | | 12/1976 | Games et al. | |
| 4,347,471 | A | * | 8/1982 | Kohzai | G05B 19/39 |
| | | | | | 318/470 |
| 4,384,242 | A | | 5/1983 | Ono | |
| 4,501,999 | A | * | 2/1985 | Kohzai | G05B 19/39 |
| | | | | | 318/632 |
| 9,016,123 | B2 | * | 4/2015 | Kimpara | G01D 5/2073 |
| | | | | | 702/6 |
| 10,830,591 | B2 | | 11/2020 | Cameron et al. | |
| 10,911,061 | B2 | | 2/2021 | Cameron et al. | |
| 2021/0325420 | A1 | | 10/2021 | Rao et al. | |
| 2022/0221308 | A1 | | 7/2022 | Heiling et al. | |

FOREIGN PATENT DOCUMENTS

| CN | 107764289 A | 3/2018 |
| CN | 111504346 A | 8/2020 |

OTHER PUBLICATIONS

Extended European Search Report for EP Application No. 24173157.9, Dated Sep. 9, 2024, pp. 5.

* cited by examiner

*Primary Examiner* — Walter L Lindsay, Jr.
*Assistant Examiner* — Milton Gonzalez
(74) *Attorney, Agent, or Firm* — Kinney & Lange, P.A.

(57) ABSTRACT

A system includes first precision rectifier operatively connected to receive high and low signals of a sine coil of a resolver and to output a first signaled condition and an exciter coil of the resolver. A second precision rectifier is operatively connected to receive high and low signals of a cosine coil of the resolver and to output a second signaled condition. A quadrant detection circuit operatively connected to receive high and low signals of the exciter coil of the resolver, high and low signals from the sine coil, and high and low signals from the cosine coil. The quadrant detection circuit outputs a signal indicative of quadrant position of the resolver.

8 Claims, 6 Drawing Sheets

TABLE 1

| EXC_PULSE | SIN_PULSE | COS_PULSE | PWM_PULSE | QUADRANT |
|---|---|---|---|---|
| HIGH | HIGH | HIGH | A% | 1 |
| HIGH | HIGH | LOW | B% | 2 |
| HIGH | LOW | LOW | C% | 3 |
| HIGH | LOW | HIGH | D% | 4 |

*Fig. 6*

RESOLVER QUADRANT DETECTION

CROSS REFERENCE TO RELATED APPLICATIONS

This application claims priority to Indian Provisional Patent Application No. IN 202341030861, filed Apr. 29, 2023. The contents of this application are incorporated herein by reference in their entirety.

BACKGROUND

1. Field

The present disclosure relates to resolvers for sensing angular position or speed, and more particularly to resolvers for detecting angular position and speed of motor shafts, actuators, servos, or the like.

2. Description of Related Art

Resolvers are traditionally interfaced in the following ways. First, the resolver signals can be interfaced to an analog to digital converter (ADC) without rectification (full bipolar swing). ADC data is used by a processor, e.g. a field programmable gated array (FPGA), to calculate the resolver position and speed. Second, the resolver can be interfaced to a resolver-to-digital converter (RDC) chip. The chip provides resolver position and speed.

In the ADC configuration above, the resolver angle computation requires the excitation, sine, and cosine signal amplitudes and their relative phases to determine the angle quadrant (among quadrants I to IV, e.g. where quadrant I is a position between 0-degrees and 90-degrees). The full bipolar signal swing is applied to the ADC, though only half of the signal swing is sufficient to determine the amplitude. So, effectively half of the ADC dynamic range is not used. To utilize the full ADC dynamic range, if the signals are precision rectified and a unipolar signal swing is directly used then the angle quadrant information would be lost. The same issues also translate to the RDC configuration above.

The conventional techniques have been considered satisfactory for their intended purpose. However, there is an ever present need for improved systems and methods for quadrant detection in resolvers. This disclosure provides a solution for this need.

SUMMARY

A system includes first precision rectifier operatively connected to receive high and low signals of a sine coil of a resolver and to output a first signaled condition. A second precision rectifier is operatively connected to receive high and low signals of a cosine coil of the resolver and to output a second signaled condition. A quadrant detection circuit operatively connected to receive high and low signals of the exciter coil of the resolver, wherein the quadrant detection circuit is operatively connected to receive high and low signals from the sine coil and from the cosine coil, and to output a signal indicative of quadrant position of the resolver.

The resolver can include the sine coil, the cosine coil, and the exciter coil, wherein the exciter coil is configured to rotate relative to the sine coil and cosine coil which are stationary relative to one another. A resolver exciter can be operatively connected to excite the exciter coil, and to provide the high and low signals of the exciter coil to the quadrant detection circuit. A processing device can be operatively connected to control the exciter.

An analog to digital converter (ADC) component can be operatively connected to receive the first signaled condition, the second signaled condition, and the signal indicative of quadrant position of the resolver, and to output a digital signal. The ADC component can include one ADC with three input channels, one input channel for each of the first signaled condition, the second signaled condition, and the signal indicative of quadrant position of the resolver. The ADC component can include: a first ADC operatively connected to receive the first signaled condition and to output a first digital signal for determining quadrant position of the resolver to the processing device; a second ADC operatively connected to receive the second signaled condition and to output a second digital signal for determining quadrant position of the resolver to the processing device; and a third ADC operatively connected to receive the signal indicative of quadrant position of the resolver and to output a digital signal for determining quadrant position of the resolver to the processing device.

A first filter can be configured to receive the high and low signals of a sine coil of the resolver and to output respective filtered high and low sine coil signals. A second filter can be configured to receive the high and low signals of the cosine coil of the resolver and to output respective filtered high and low cosine coil signals. A multi-channel analog multiplexer can be operatively connected to receive filtered output from the first and second filters, to receive the signal indicative of quadrant position of the resolver from the quadrant detection circuit, and to output one or more multiplexed signals. A differential to single ended converter can be operatively connected to receive the one or more multiplexed signals and to output a single analog signal. A precision rectifier can be operatively connected to receive the single analog signal and to output a rectified single signal. An analog to digital converter (ADC) can be operatively connected to receive the rectified single signal and to output a digital signal indicative of resolver position to the processing device.

The quadrant detection circuit can include logic configured to output a signal indicative of resolver position in a first quadrant upon receiving high input of the sine coil, high input of the cosine coil, and high input of the exciter coil. The logic can be configured to output a signal indicative of resolver position in a second quadrant upon receiving high input of the sine coil, low input of the cosine coil, and high input of the exciter coil. The logic can be configured to output a signal indicative of resolver position in a third quadrant upon receiving low input of the sine coil, low input of the cosine coil, and high input of the exciter coil. The logic can be configured to output a signal indicative of resolver position in a fourth quadrant upon receiving low input of the sine coil, high input of the cosine coil, and high input of the exciter coil.

The quadrant detection circuit can include a first zero crossing detector for the high and low signals of the exciter coil configured to output a high or low output for the exciter coil. A second zero crossing detector for the high and low signals of the sine coil can be configured to output a high or low output for the sine coil. A third zero crossing detector for the high and low signals of the cosine coil can be configured to output a high or low signal for the cosine coil. The logic can be configured to determine quadrant position of the resolver based on output from the first, second, and third zero crossing detectors. The logic can include PWM generator configured to output a PWM signal with a respective predetermined duty cycle representative of each of the respective four quadrants of the quadrant position of the resolver. The processing device can be configured to interpret a digital representation of the PWM signal into a quadrant position of the resolver, and to provide output indicative of angular speed and/or position of the resolver.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
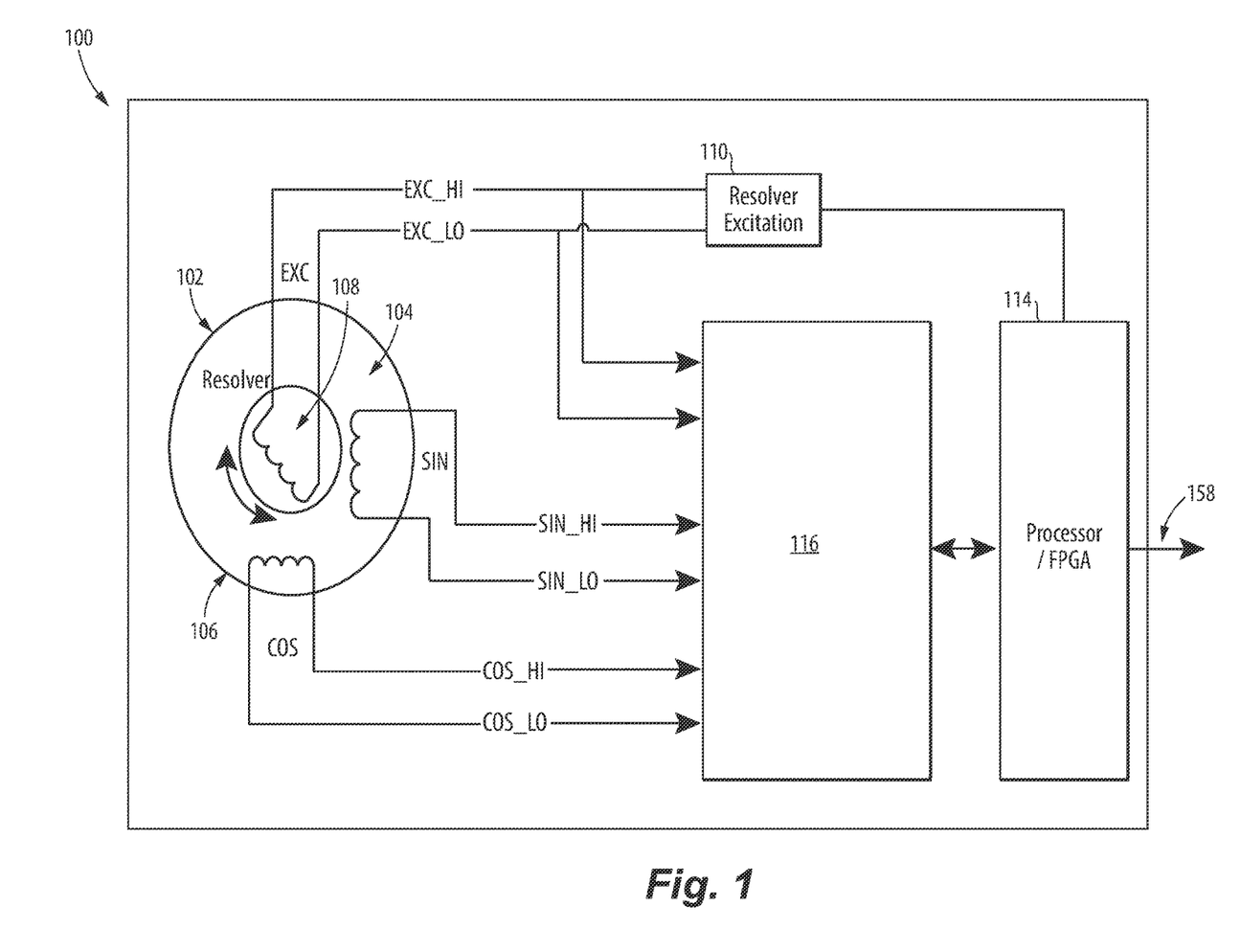
FIG. 1 is a schematic view of an embodiment of a system constructed in accordance with the present disclosure, showing the resolver and sensor signal processing block.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-5 and TABLE 1, as will be described. The systems and methods described herein can be used to determine in which quadrant a resolver is positioned for angular position and angular speed measurements.

This disclosure describes a method by which a resolver can be interfaced using a unipolar signal swing in a precision rectifier based data acquisition system. Thereby the benefit of improved signal to noise ratio (SNR) and effective bit resolution can be derived by use of the full analog to digital converter (ADC) dynamic range. Four quadrants can be represented in a single signal, e.g., if the signal is pulse width modulated (PWM). A quadrant detection circuit, which accepts excitation, sine, and cosine, can generate a PWM output based on the phase difference of the signals, which output can be used to represent the resolver quadrant.

The system 100 includes a resolver 102. The resolver 102 includes the sine coil 104, the cosine coil, 106 and the exciter coil 108. The exciter coil 108 is configured to rotate, as indicated by the double headed, curved arrow in FIG. 1, relative to the sine coil 104 and cosine coil 106, which are stationary relative to one another. Those skilled in the art will readily appreciate that the resolver 102 can be a rotary transformer type as depicted in FIG. 1, or a variable reluctance type with no rotor winding, without departing from the scope of this disclosure. A resolver exciter 110 is operatively connected to excite the exciter coil 108, and to provide the high and low signals of the exciter coil 108 to the quadrant detection circuit 112, shown in FIGS. 2-5. A processing device 114, such as a processor, field programmable gate array (FPGA), or the like, is operatively connected to control the exciter 110. A sensor signal processing block 116 is connected between the coils 104, 106, 108 and the processing device 114, as described below with respect to FIGS. 2-4.

Figure 2:
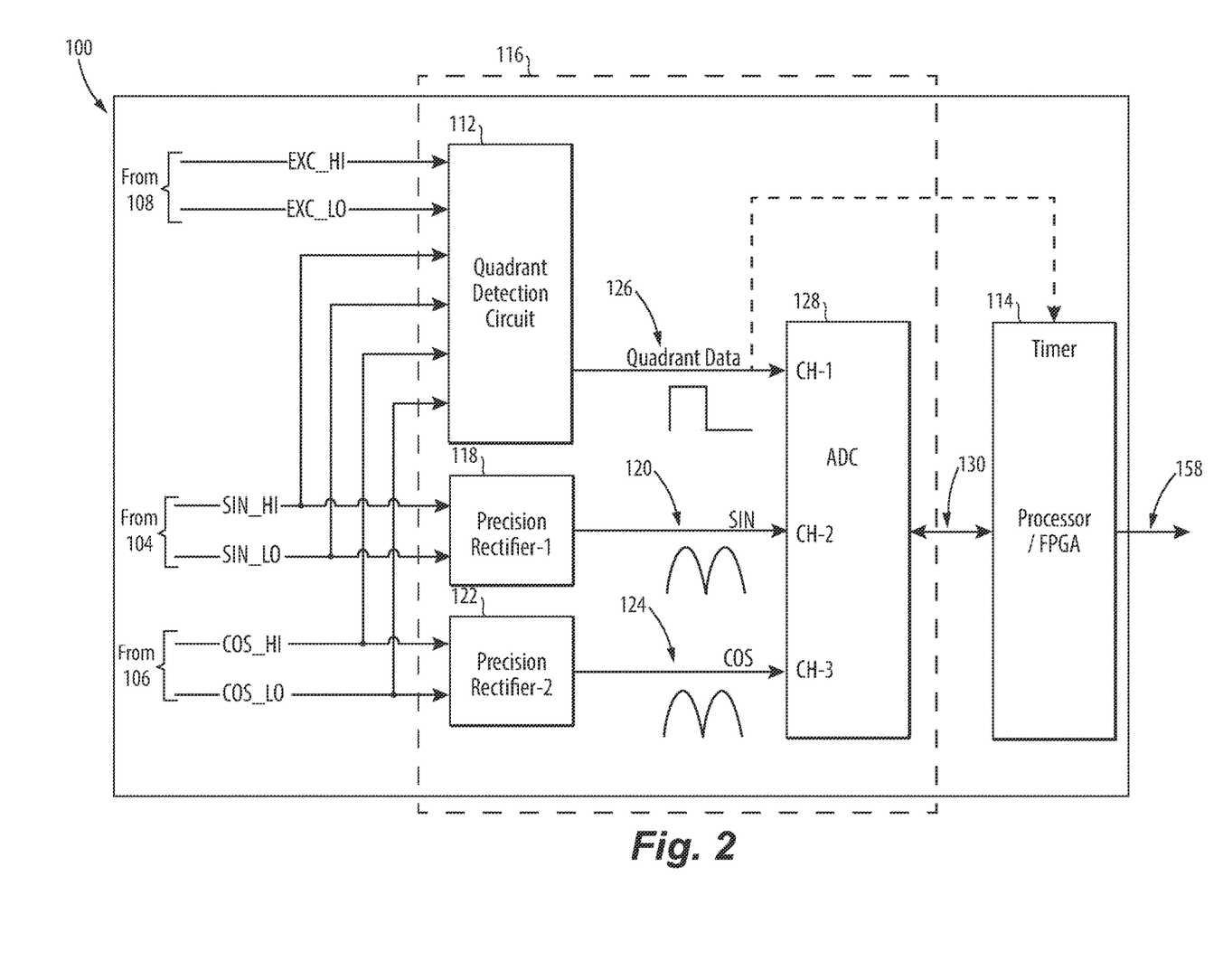
FIG. 2 is a schematic view of a portion of the system of FIG. 1, showing an embodiment of the sensor signal processing block with one analog to digital converter (ADC) with three input channels.
Figure 5:
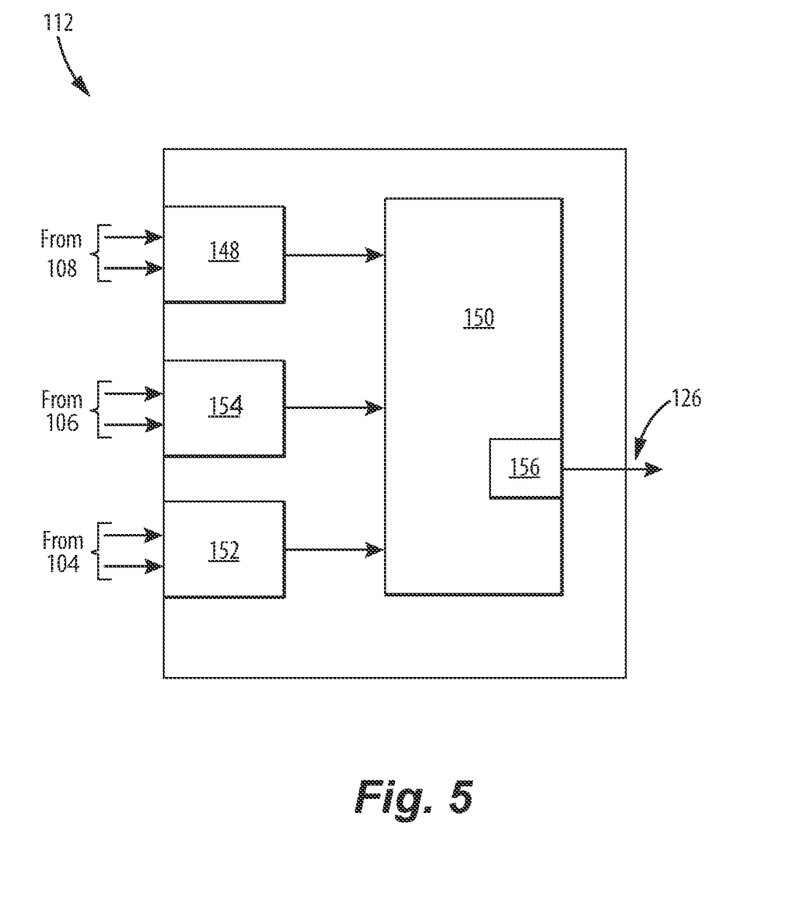
FIG. 5 is a schematic view of the quadrant detection circuit of FIGS. 2-4.

Referring now to FIG. 2, a first precision rectifier 118 is operatively connected to receive high and low signals of the sine coil of a resolver and to output a signaled condition 120 indicative of precision rectified output of the input signal to the first precision rectifier 118. A second precision rectifier 122 is operatively connected to receive high and low signals of the cosine coil 106 of the resolver 102 of FIG. 1, and to output a signaled condition 124 indicative of precision rectified output of the input signal received by the second precision rectifier 122. The quadrant detection circuit 112 is operatively connected to receive high and low signals of the exciter coil 108, as well as the high and low signals of the sine and cosine coils 104, 106. The quadrant detection circuit 112 is configured to output a pulse width modulated (PWM) signal 126 indicative of quadrant position of the resolver 102 of FIG. 1.

With continued reference to FIG. 2, an analog to digital converter (ADC) component 128 is operatively connected to receive the signaled conditions 120, 124 indicative of relative phase of the sine and cosine coils 104, 106, and the signal 126 indicative of quadrant position, and to output a digital signal 130 to the processing device 114 indicative of resolver position, including quadrant data. The Processor/FPGA communicates ADC configuration data and also typically the clock signal which synchronizes the data transfer over the, e.g. serial peripheral interface (SPI), bus. The ADC component 128 in FIG. 2 includes one ADC with three input channels, one input channel for each of the signaled conditions 120, 124, and one channel for the signal 126 indicative of quadrant position of the resolver.

Figure 3:
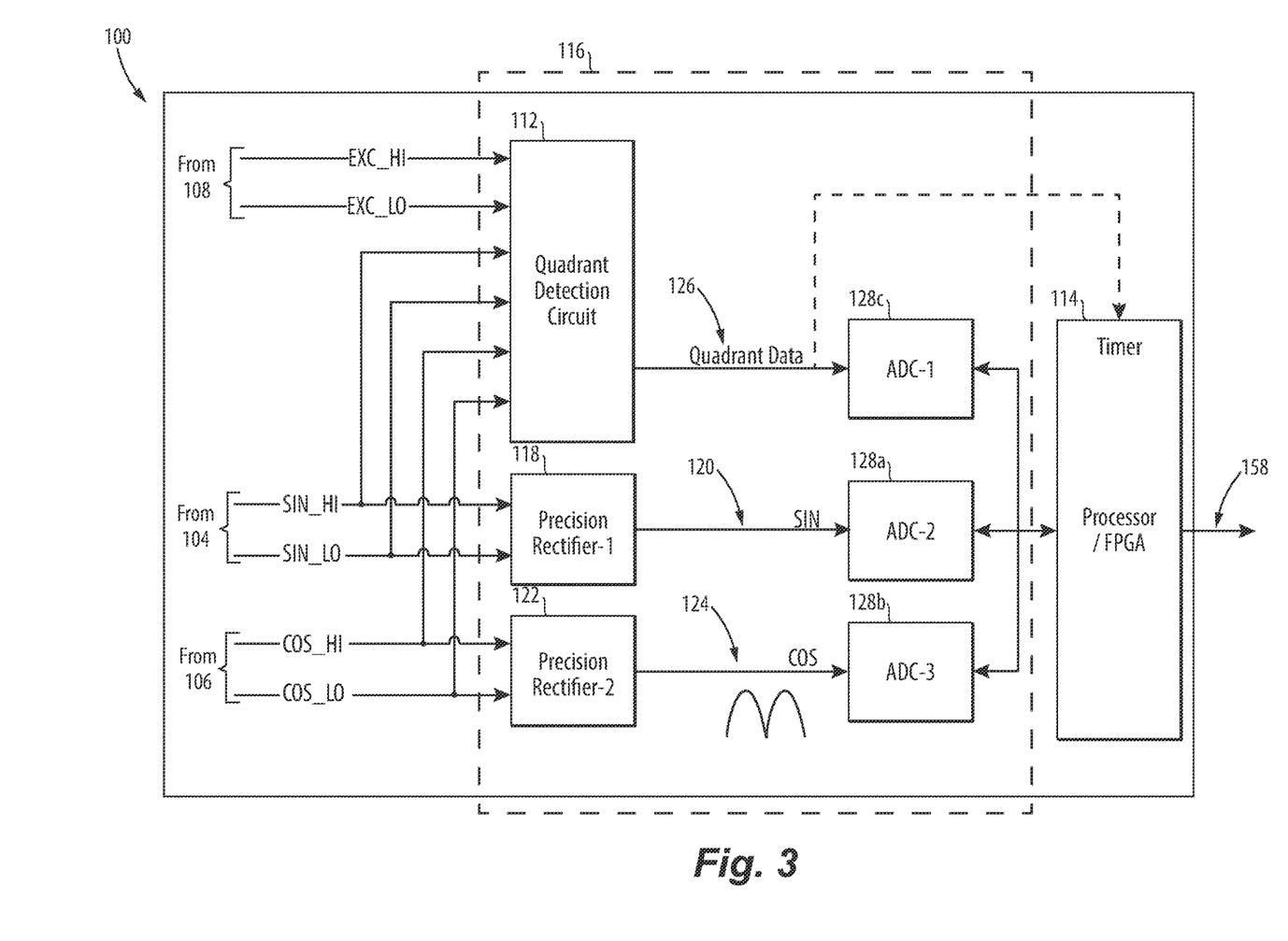
FIG. 3 is a schematic view of a portion of the system of FIG. 1, showing an embodiment of the sensor signal processing block with three separate ADC's, each with a single input channel.

With reference now to FIG. 3, instead of the ADC component 128 being one ADC with three input channels as in FIG. 2, the ADC component in FIG. 3 includes three separate one channel ADCs 128a, 128b, 128c. The first ADC 128a is operatively connected to receive the signaled condition 120 and to output a first digital signal to the processing device 114. The second ADC 128b is operatively connected to receive the signaled condition 124 and to output a second digital signal to the processing device 114. The third ADC 128c is operatively connected to receive the signal 126 indicative of quadrant position of the resolver and to output a third digital signal for determining quadrant position of the resolver to the processing device 114. In FIGS. 2 and 3, the signal 126 can also be used for timer input to the processing device as indicated by the arrow with the broken lines. When the signal 126 is interfaced to a timer then, it is not required to be connected to CH-1. The PWM duty cycle can be measured by the timer block and using the measurement from CH-2 and CH-3 the position and speed can be calculated (note that CH-1, Ch-2, and CH-3 are shown in FIG. 2, and in FIG. 3 these are ADC-1, ADC-2, and ADC-3, respectively). If is desired to measure only the speed, then speed can be easily found out by connecting signal 126 to the timer.

Figure 4:
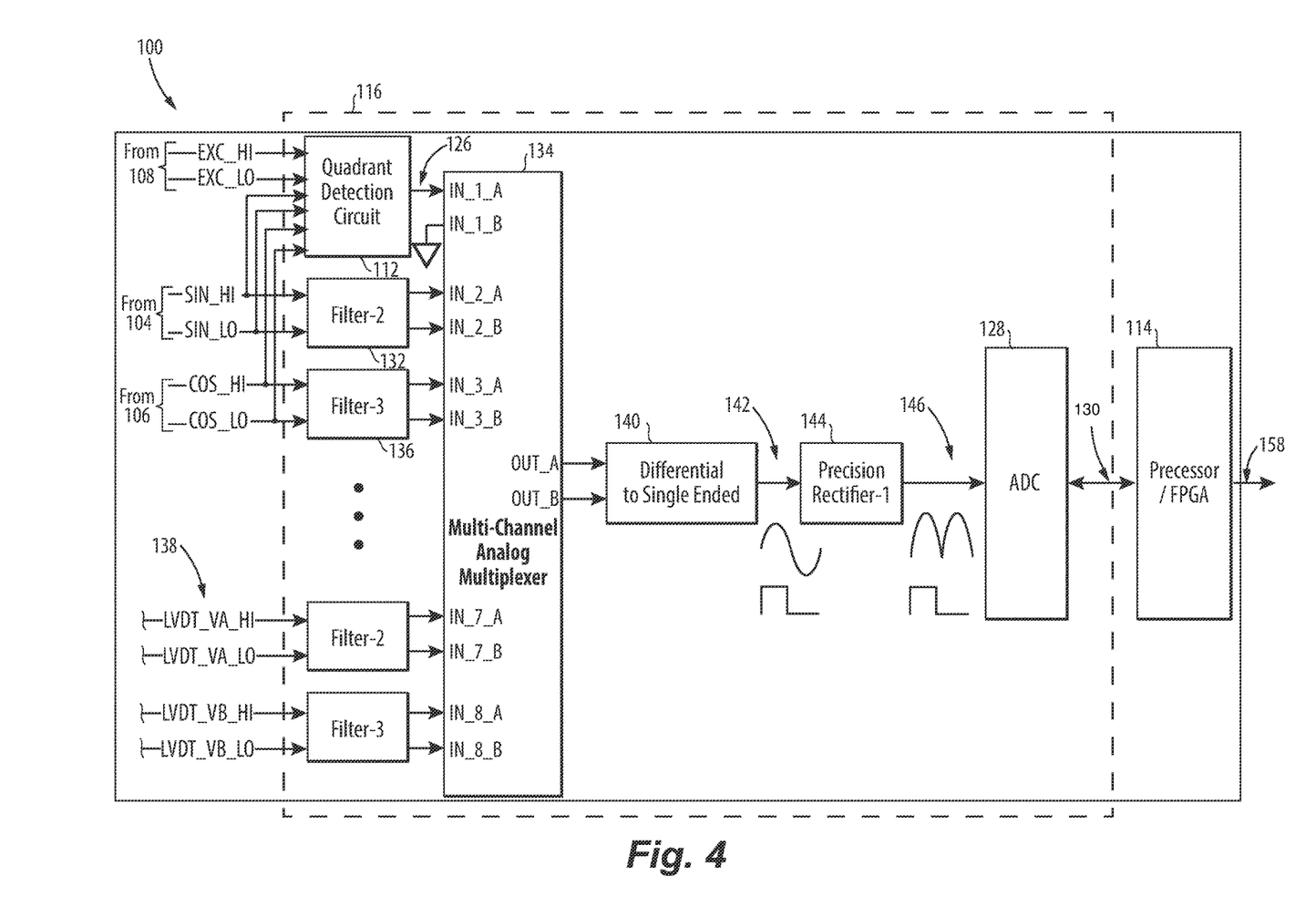
FIG. 4 is a schematic view of a portion of the system of FIG. 1, showing an embodiment of the sensor signal processing block with a multi-channel analog multiplexer.

With reference now to FIG. 4, another configuration for the sensor signal processing block 116 is shown. A filter 132 is configured to receive the high and low signals of the sine coil 104 and to output respective filtered high and low sine coil signals to multi-channel analog multiplexor 134. A filter 136 is configured to receive the high and low signals of the cosine coil 106 and to output respective filtered high and low cosine coil signals to the multi-channel analog multiplexor 134. The multi-channel analog multiplexer is operatively connected to receive the filtered output from the filters 132, 136, to receive the signal 126 indicative of quadrant position from the quadrant detection circuit 112, and potentially any suitable number of other inputs 138 (e.g. with respective filters), and to output multiplexed signals OUT_A and OUT_B. OUT_A and OUT_B carry the selected differential signal out of all the signals at the input of the analog multiplexer 134. The signal is selected by the FPGA/ Processor 114 by switching the multiplexer channel (those control signals from the FPG/Processor 114 to the multiplexor 134 are not shown in FIG. 4). The FPGA/Processor 114 typically does a round robin selection of the multiplexer inputs, starting from the first input channel and then sequencing through the rest so that each analog input can be sequentially digitized by the ADC 128. A differential to single ended converter 140 is operatively connected to receive OUT_A and OUT_B and to output a single ended analog signal 142. A precision rectifier 144 is operatively connected to receive the single ended analog signal 142 and to output a rectified single signal 146. An ADC 128 is operatively connected to receive the rectified single signal 146 and to output a digital signal 130 indicative of resolver position, including quadrant location, to the processing device 114.

Referring now to FIG. 5, the quadrant detection circuit 112 includes a first zero crossing detector 148 for the high and low signals of the exciter coil 108 configured to output a logic level high or logic level low output for the exciter coil 108 to the logic 150. A second zero crossing detector 152 for the high and low signals of the sine coil is configured to output a logic level high or logic level low output for the sine coil 104 to the logic 150. A third zero crossing detector 154 for the logic level high and logic level low signals of the cosine coil 106 is configured to output a high or low signal for the cosine coil 106 to the logic. The logic 150 of the quadrant detection circuit 112 is configured to determine quadrant position of the resolver 102 (labeled in FIG. 1) based on output from the first, second, and third zero crossing detectors 148, 152, 154. The logic 150 includes PWM generator 156 configured to output a PWM signal 126 with a respective predetermined duty cycle, e.g. the percentages listed in the fourth column of TABLE 1, representative of each of the respective four quadrants of the quadrant position of the resolver 102 labeled in FIG. 1. The processing device 114 (labeled in FIGS. 1-4) is configured to interpret a digital representation of the PWM signal 126 into a quadrant position of the resolver 102 (labeled in FIG. 1), and to provide output 158 (labeled in FIG. 1), e.g. for use as feedback in a control circuit or the like, indicative of angular speed and/or position of the resolver 102 (labeled in FIG. 1).

Figure 6:
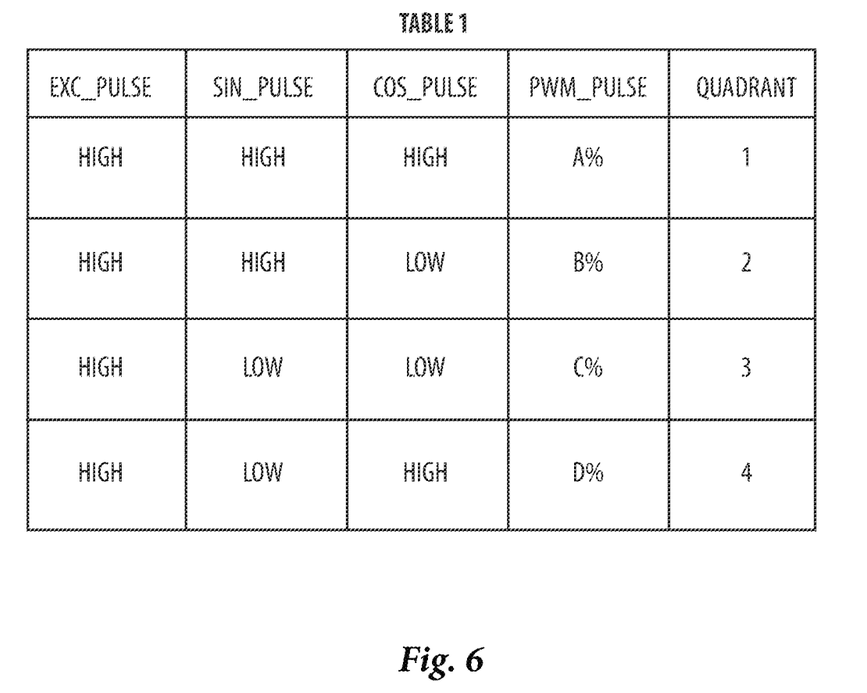
FIG. 6 is a figure of TABLE 1, which depicts a truth table for determining quadrant position of the resolver based on inputs from the sine and cosine coils.

With reference to FIG. 5 and to TABLE 1, logic 150 is configured to output a signal 126 indicative of resolver position in a first quadrant, e.g. between 0-degrees to 90-degrees, upon receiving high input of zero crossing detector 152 of the sine coil (hereafter abbreviated to high input of the sine coil, and low input of the zero crossing detector 152 is hereafter abbreviated to low input of the sine coil), high input of zero crossing detector 154 of the cosine coil (hereafter abbreviated to high input of the cosine coil, and low input of the zero crossing detector 154 is hereafter abbreviated to low input of the cosine coil), and high input of the zero crossing detector 148 of the exciter coil (hereafter high input of the exciter coil, and low input of the zero crossing detector 148 is hereafter referred to as low input of the exciter coil), as indicated in the first row of TABLE 1. The logic 150 is configured to output a signal 126 indicative of resolver position in a second quadrant, e.g. between 90-degrees to 180-degrees, upon receiving high input zero of the sine coil, low input of the cosine coil, and high input of the exciter coil, as indicated in the second row of TABLE 1. The logic 150 is configured to output a signal 126 indicative of resolver position in a third quadrant, e.g. between 180-degrees to 270-degrees, upon receiving low input of the sine coil, low input of the cosine coil, and high input of the exciter coil, as indicated in the third row of TABLE 1. The logic 150 is configured to output a signal 126 indicative of resolver position in a fourth quadrant, e.g. between 270-degrees to 0-degrees, upon receiving low input of the sine coil, high input of the cosine coil, and high input of the exciter coil. Note that in order to determine the correct quadrant, the sine and cosine output signals should be compared against the excitation output signal, which in TABLE 1 are given for HIGH excitation output but would be reversed in polarity for LOW excitation output. Those skilled in the art will readily appreciate that the logic 150 can include any suitable type of logic such as analog circuit components, digital circuit components, digital processing devices with machine readable instructions, or the like, configured to perform the functions described herein.

Systems and methods as disclosed herein provide various potential benefits including the following. This disclosure describes a method by which the resolver can be interfaced using a unipolar signal swing in a precision rectifier based data acquisition system. Thereby the benefit of improved Signal to Noise ratio (SNR) and effective bit resolution can be derived by use of the full ADC dynamic range. Quadrant detection output alone can also be used for speed and direction measurement in applications where position measurement is not required.

The methods and systems of the present disclosure, as described above and shown in the drawings, provide for determining in which quadrant a resolver is positioned for angular position and angular speed measurements. While the apparatus and methods of the subject disclosure have been shown and described with reference to preferred embodiments, those skilled in the art will readily appreciate that changes and/or modifications may be made thereto without departing from the scope of the subject disclosure.

What is claimed is:
1. A system comprising:
a resolver including a sine coil, a cosine coil, and an exciter coil;
a resolver exciter operatively connected to excite the exciter coil, and to provide high and low signals;
a processing device operatively connected to control the resolver exciter;
first precision rectifier operatively connected to receive high and low signals of the sine coil of the resolver and to output a first signaled condition;

a second precision rectifier operatively connected to receive high and low signals of the cosine coil of the resolver and to output a second signaled condition; and a quadrant detection circuit operatively connected to receive high and low signals of the exciter coil of the resolver from the resolver exciter, wherein the quadrant detection circuit is operatively connected to receive high and low signals from the sine coil and from the cosine coil, and to output a signal indicative of quadrant position of the resolver; and an analog to digital converter (ADC) component operatively connected to receive the first signaled condition, the second signaled condition, and the signal indicative of quadrant position of the resolver, and to output a digital signal, wherein the ADC component includes:
a first ADC operatively connected to receive the first signaled condition and to output a
first digital signal for determining quadrant position of the resolver to the processing device;
a second ADC operatively connected to receive the second signaled condition and to output a second digital signal for determining quadrant position of the resolver to the processing device; and
a third ADC operatively connected to receive the signal indicative of quadrant position of
the resolver and to output a digital signal for determining quadrant position of the resolver to the processing device.

2. The system as recited in claim 1, wherein the quadrant detection circuit includes logic configured to output a signal indicative of resolver position in a first quadrant upon receiving high input of the sine coil, high input of the cosine coil, and high input of the exciter coil.

3. The system as recited in claim 2, wherein the logic is configured to output a signal indicative of resolver position in a second quadrant upon receiving high input of the sine coil, low input of the cosine coil, and high input of the exciter coil.

4. The system as recited in claim 3, wherein the logic is configured to output a signal indicative of resolver position in a third quadrant upon receiving low input of the sine coil, low input of the cosine coil, and high input of the exciter coil.

5. The system as recited in claim 4, wherein the logic is configured to output a signal indicative of resolver position in a fourth quadrant upon receiving low input of the sine coil, high input of the cosine coil, and high input of the exciter coil.

6. A system comprising:
first precision rectifier operatively connected to receive high and low signals of a sine coil of a resolver and to output a first signaled condition;
a second precision rectifier operatively connected to receive high and low signals of a cosine coil of the resolver and to output a second signaled condition; and
a quadrant detection circuit operatively connected to receive high and low signals of the exciter coil of the resolver, wherein the quadrant detection circuit is operatively connected to receive high and low signals from the sine coil and from the cosine coil, and to output a signal indicative of quadrant position of the resolver, wherein the quadrant detection circuit includes:
a first zero crossing detector for the high and low signals of the exciter coil configured to output a high or low output for the exciter coil;
a second zero crossing detector for the high and low signals of the sine coil configured to output a high or low output for the sine coil;
a third zero crossing detector for the high and low signals of the cosine coil configured to output a high or low signal for the cosine coil; and
wherein the quadrant detection circuit includes logic configured to determine quadrant position of the resolver based on output from the first, second, and third zero crossing detectors.

7. The system as recited in claim 6, wherein the logic includes PWM generator configured to output a PWM signal with a respective predetermined duty cycle representative of each of the respective four quadrants of the quadrant position of the resolver.

8. The system as recited in claim 7, wherein the processing device is configured to interpret a digital representation of the PWM signal into a quadrant position of the resolver, and to provide output indicative of angular speed and/or position of the resolver.

* * * * *